US010666348B1

(12) United States Patent
Legare

(10) Patent No.: US 10,666,348 B1
(45) Date of Patent: May 26, 2020

(54) PHASED ARRAY RECEIVER WITH REDUCED NUMBER OF BEAM FORMER ELEMENTS

(71) Applicant: GOVERNMENT OF THE UNITED STATES AS REPRESENTED BY THE SECRETARY OF THE AIR FORCE, Rome, NY (US)

(72) Inventor: David J. Legare, Ava, NY (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 0 days.

(21) Appl. No.: 16/240,985

(22) Filed: Jan. 7, 2019

Related U.S. Application Data

(60) Provisional application No. 62/614,546, filed on Jan. 8, 2018.

(51) Int. Cl.
| H04B 7/08 | (2006.01) |
| H01Q 3/38 | (2006.01) |
| H01Q 21/22 | (2006.01) |

(52) U.S. Cl.
CPC ............. H04B 7/0885 (2013.01); H01Q 3/38 (2013.01); H01Q 21/22 (2013.01)

(58) Field of Classification Search
CPC ................ H04B 1/0885; H04B 7/1858; H04B 7/18515; H01Q 1/288; H01Q 1/06; H01Q 1/38; H01Q 21/0025; H01Q 21/22; H01Q 3/247; H01Q 1/247
See application file for complete search history.

(56) References Cited

U.S. PATENT DOCUMENTS

| 5,694,134 A | 12/1997 | Barnes |
| 5,940,030 A | 8/1999 | Hampel et al. |
| 7,180,447 B1* | 2/2007 | Jacomb-Hood .... H04B 7/18515 342/374 |
| 2002/0021246 A1* | 2/2002 | Martek ................. H01Q 21/22 342/373 |
| 2015/0378241 A1 | 12/2015 | Eldada |

(Continued)

OTHER PUBLICATIONS

Abdellatif, A., et al., "Novel Low Cost Compact Phased Array Antenna for Millimeter-wave 3D Beam Scanning Applications," Antennas and Propagation Society International Symposium (APSURSI), 2014 IEEE, pp. 1145-1146, Sep. 22, 2014.

(Continued)

*Primary Examiner* — Thanh C Le
(74) *Attorney, Agent, or Firm* — Adam Gene Pugh

(57) ABSTRACT

An apparatus, system, and method for a receive function in a phased array including an M by N array of antenna elements, where M and N are the number of rows and columns, respectively, in the array of antenna elements. Each antenna element is provided with a combiner. The phased array apparatus and system includes M row beam-formers plus N column beam-formers. The row beam-formers supply a progressively phase-shifted carrier signal to the combiners where the signal received by the corresponding antenna element is combined with a phase-shifted carrier signal. The outputs of the combiners in each column of antenna elements is sent to a corresponding column beam-former. The outputs of the column beam-formers are combined to recover the signal that is desired to be received.

20 Claims, 11 Drawing Sheets

(56) References Cited

U.S. PATENT DOCUMENTS

2018/0019800 A1* 1/2018 Buer ................. H04B 7/18589
2018/0109004 A1* 4/2018 Mu .................... H04B 7/0848
2019/0319368 A1* 10/2019 Fillion ................. H01Q 21/22

OTHER PUBLICATIONS

Ehyaie, D., "Novel Approaches to the Design of Phased Array Antennas," Dissertation for Doctor of Philosophy degree, The University of Michigan, 2011, 153 pages.

* cited by examiner

PHASED ARRAY RECEIVER WITH REDUCED NUMBER OF BEAM FORMER ELEMENTS

CROSS-REFERENCE TO RELATED APPLICATION(S)

This application claims the benefit of U.S. Provisional Patent Application No. 62/614,546 filed on Jan. 8, 2018, the complete disclosure of which is incorporated herein by reference in its entirety.

GOVERNMENT INTEREST

The invention described herein may be manufactured and used by or for the Government of the United States for all government purposes without the payment of any royalty.

BACKGROUND

Field of the Invention

The embodiments herein generally relate to phased array antennas, and more particularly to steerable phased array antennas with reduced numbers of beam-former components.

Background of the Invention

In conventional phased array antenna design, there is typically at least one beam-former per antenna element. This can result in very complex and expensive circuit packaging design due to the size of the components and large number of control connections for the beam-former hardware, and the requirement to maintain proper RF feed line lengths between the beam-formers and their respective antenna elements. Regulatory issues requiring larger apertures typically cause an increase proportional to the square of length of one side in the number of required elements, and consequently further increases the system cost and complexity. Accordingly, the practical implementation of the phased array antenna system may become unmanageable for all but small aperture antennas, which limits the scope for use of this technology.

Traditionally, an N×N element phased array antenna requires $N^2$ phase shifters (i.e., beam-formers). These are typically monolithic microwave integrated circuits (MMICs) costing around $40 to $50 each, and are the most expensive part of the production antenna. With an antenna element spacing of $\lambda/2$, and the need for the phase shifters to be located close to and equidistant from each corresponding patch element, packing in the Z direction is required, thus making the antenna thicker and having a higher profile. This also greatly complicates packaging complexity and cost.

A number of technologies have been employed to mitigate the above. These include smaller MMIC packages and lower loss components and RF transmission line designs. These help to reduce packaging density and the number of other system components such as amplifiers (PAs and LNAs). However, it appears that the only path to a meaningful reduction in the antenna size, complexity, and manufacturing cost is a new system architecture that eliminates or significantly reduces the requirements for phase and amplitude control at each antenna element.

BRIEF SUMMARY OF THE INVENTION

In view of the foregoing, an embodiment herein provides a phased array apparatus including an array of antenna elements arranged in M rows and N columns, wherein M and N are positive integers, M corresponds to the number of rows in the array of antenna elements, and N corresponds to the number of columns in the array of antenna elements. Each of the antenna elements may also be identified by mn corresponding to the row and column position, respectively, of the antenna element.

The phased array apparatus further includes a plurality of combiners. At least one combiner is provided for each antenna element such that there are at least MxN combiners. The phased array apparatus further includes a first plurality of beam-formers corresponding in number to the number of rows in the array of antenna elements with each of the first plurality of beam-formers being associated with a corresponding row of antenna elements. Each of the first plurality of beam-formers is operatively connected to one of the two inputs of the combiner for each antenna element in the corresponding row of antenna elements.

The phased array apparatus further includes a second plurality of beam-formers corresponding in number to the number of columns in the array of antenna elements with each of the second plurality of beam-formers being associated with a corresponding column of antenna elements. Each of the second plurality of beam-formers is operatively connected to the output of the combiner for each antenna element in the corresponding column of the array of antenna elements.

The phased array apparatus further includes a carrier signal generator (producing a carrier signal that is at the same carrier frequency of the desired receive signal that is to be received by the phased array apparatus) that is operatively connected to a first plurality of beam-formers. The phased array apparatus is designed to operate in the receive mode.

The carrier signal generator is configured to provide the same carrier signal in phase to each of the first plurality of beam-formers. Each of the beam-formers in the first plurality of beam-formers provides a corresponding beam-former output signal to one of the inputs in each combiner for each antenna element in the corresponding row of antenna elements. Each of the antenna elements mn is further operatively connected to the other input of its corresponding combiner. Thus, each of the antenna elements is configured to receive a signal that is desired/intended to be received by the phased array apparatus, and is incident on the array of antenna elements, and to then provide the resulting received signal to this input of its corresponding combiner.

Each combiner produces an output based on the received signal from the corresponding antenna element and the beam-former output from the corresponding beam-former in the first plurality of beam-formers. The received-signal-based output from each combiner is first input to a phase corrector (to impart either a zero or 180° phase shift to the signal) based upon whether the mathematical relationship $$\cos\left(m\alpha + \frac{n\beta}{2}\right)$$

is positive or negative. The output is then directed to a corresponding beam-former in the second plurality of beam-formers.

The combined outputs of the second plurality of beam-formers (column beam-formers) are then summed together to produce the received signal output of the total phased array antenna, also referred to herein as the received total antenna array output signal.

In an embodiment of the phased array apparatus, the first plurality of beam-formers are configured to taper the carrier signal over the rows of the array of antenna elements by each of the first plurality of beam-formers introducing a phase shift of $-m\alpha$ to the generated carrier signal such that each of the beam-formers in the first plurality of beam-formers provides a corresponding beam-former output signal to one of the inputs of each combiner for each antenna element in the corresponding row of the array of antenna elements that is phase shifted by $-m\alpha$, wherein each row of the array of antenna elements is identified by a sequential row index m, wherein m is an integer in the range $$1 \le m \le M, \alpha = Kd_x\sin(\theta)\cos(\varphi), K = \frac{2\pi}{\lambda}, d_x = \lambda/2,$$

$\lambda$ is the wavelength of the carrier signal, $d_x$ is the spacing between the antenna elements in each row, and $(\theta, \varphi)$ are the angles in a spherical coordinate system for the direction in which the antenna is intended to be electronically pointed, and thus, the direction from which the expected/desired receive signal is expected to arrive. The receive signal impinging on each of the antenna array elements mn is then directed to the other combiner input of each of the combiners mn, which when combined with the aforementioned generated and phase shifted carrier signal entering the opposing input of the each of the combiners mn produces an output signal from each of the combiners mn. This output signal is then either phase inverted (phase shifted by 180°) or not based on the sign of the mathematical calculation $$\cos\left(m\alpha + \frac{n\beta}{2}\right).$$

In the phased array apparatus, the second plurality of beam-formers are configured to receive the output (after the aforementioned phase inversion decision process) from each combiner in a corresponding column of the array of antenna elements and introduce a phase shift of $-n\beta/2$ to a column output signal formed by combining the received-signal-based outputs it receives from the combiners in the corresponding column of the array of antenna elements so as to produce a phase-shifted column output signal that is phase shifted by $-n\beta/2$, wherein each column of the array of antenna elements is identified by a sequential column index n, wherein n is an integer in the range $$1 \le n \le N, \beta = Kd_y\sin(\theta)\sin(\varphi), K = \frac{2\pi}{\lambda}, d_y = \lambda/2,$$

$\lambda$ is the wavelength of the carrier signal, $d_y$ is the spacing between the antenna elements in each column, and $(\theta, \varphi)$ are the angles in a spherical coordinate system for the direction in which the antenna is intended to be electronically pointed, and thus, the direction from which the expected/desired receive signal is expected to arrive.

The method further comprises the step of adjusting the amplitude (via a variable gain amplifier) and phase (via a phase shifter) of the generated carrier signal so that the amplitude and phase of the generated carrier entering into one of the inputs of each of the combiners mn are the same or as close as possible to the amplitude and phase of the desired/intended receive signal impinging on the antenna element and subsequently being delivered to the other input of each of the combiners mn. This can be done by scanning the amplitude and phase of the generated carrier until the desired receive signal appears at the output of the antenna array, in a manner similar to tuning the local oscillator of a radio until the desired receive signal is observed.

Another embodiment provides a phased array system comprising a phased array apparatus and a controller therefor, to calculate, generate and provide control signals the first and second plurality of row and column beam-formers corresponding to the desired antenna electronic pointing angle $(\theta, \varphi)$. The embodiments herein have utility, for example, for communications antennae and radar.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF THE INVENTION

Figure 1:
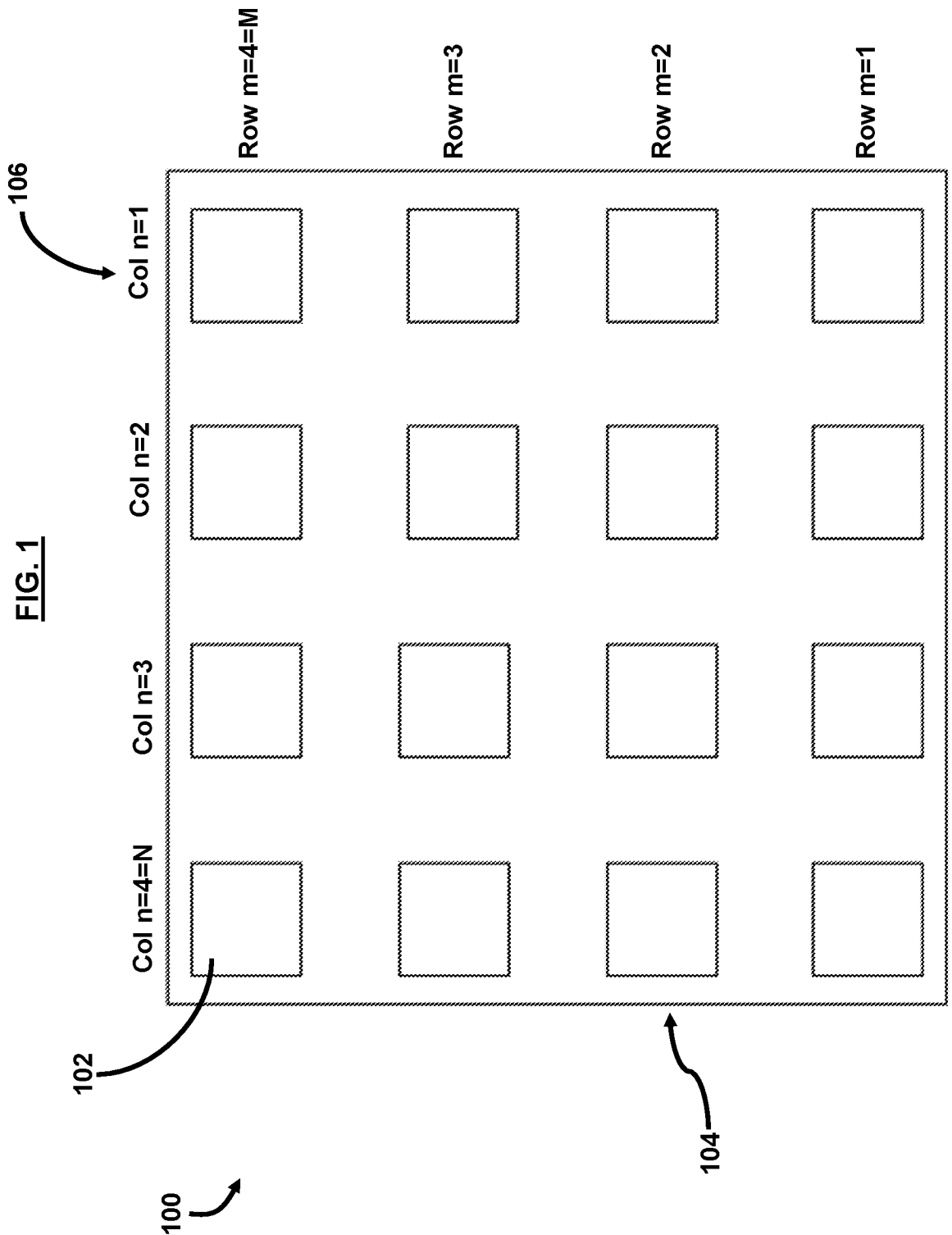
FIG. 1 illustrates the layout of an array of antenna elements, according to an example.
Figure 2:
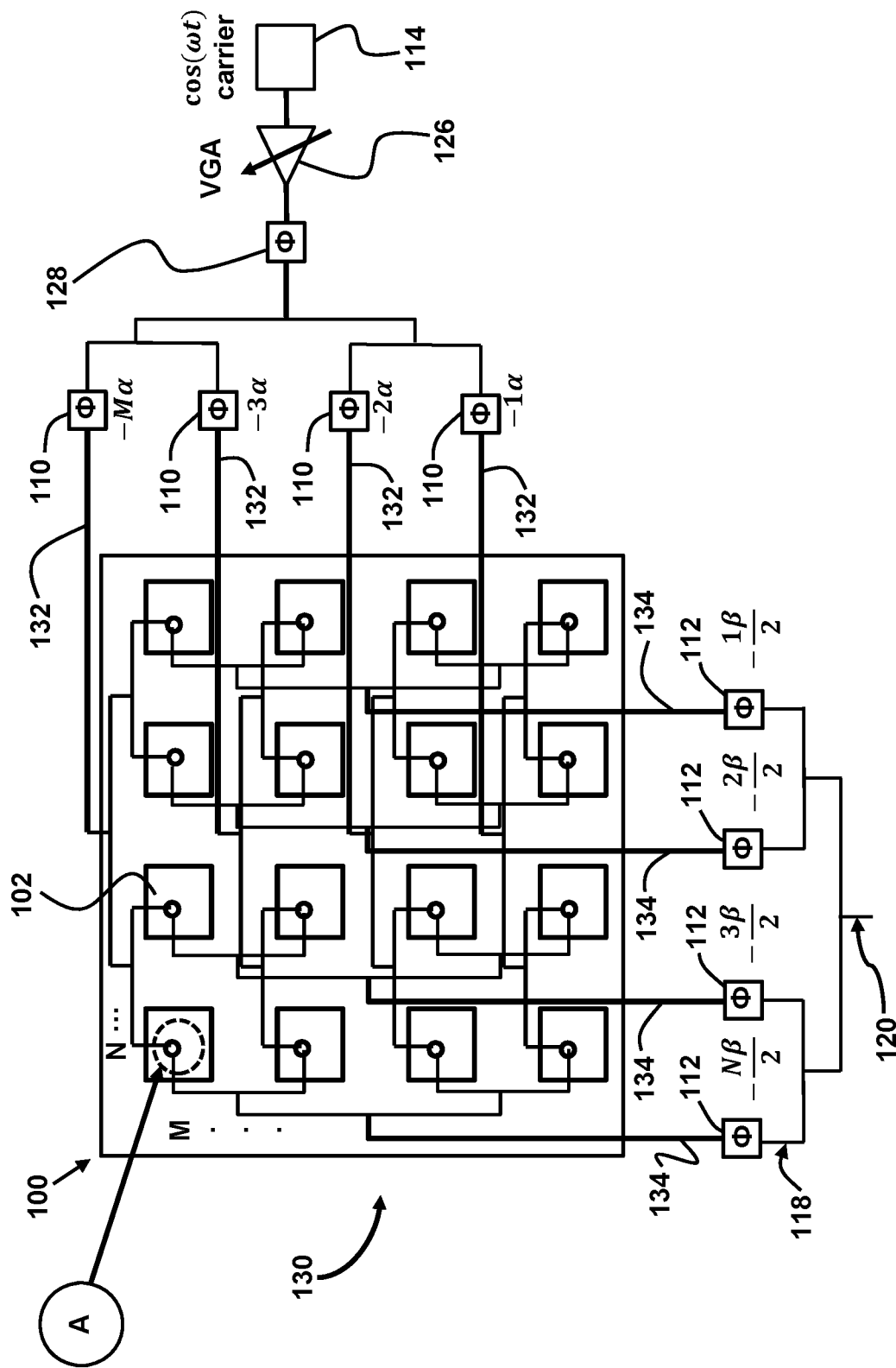
FIG. 2 is a schematic diagram illustrating a phased array apparatus, according to an example.
Figure 3:
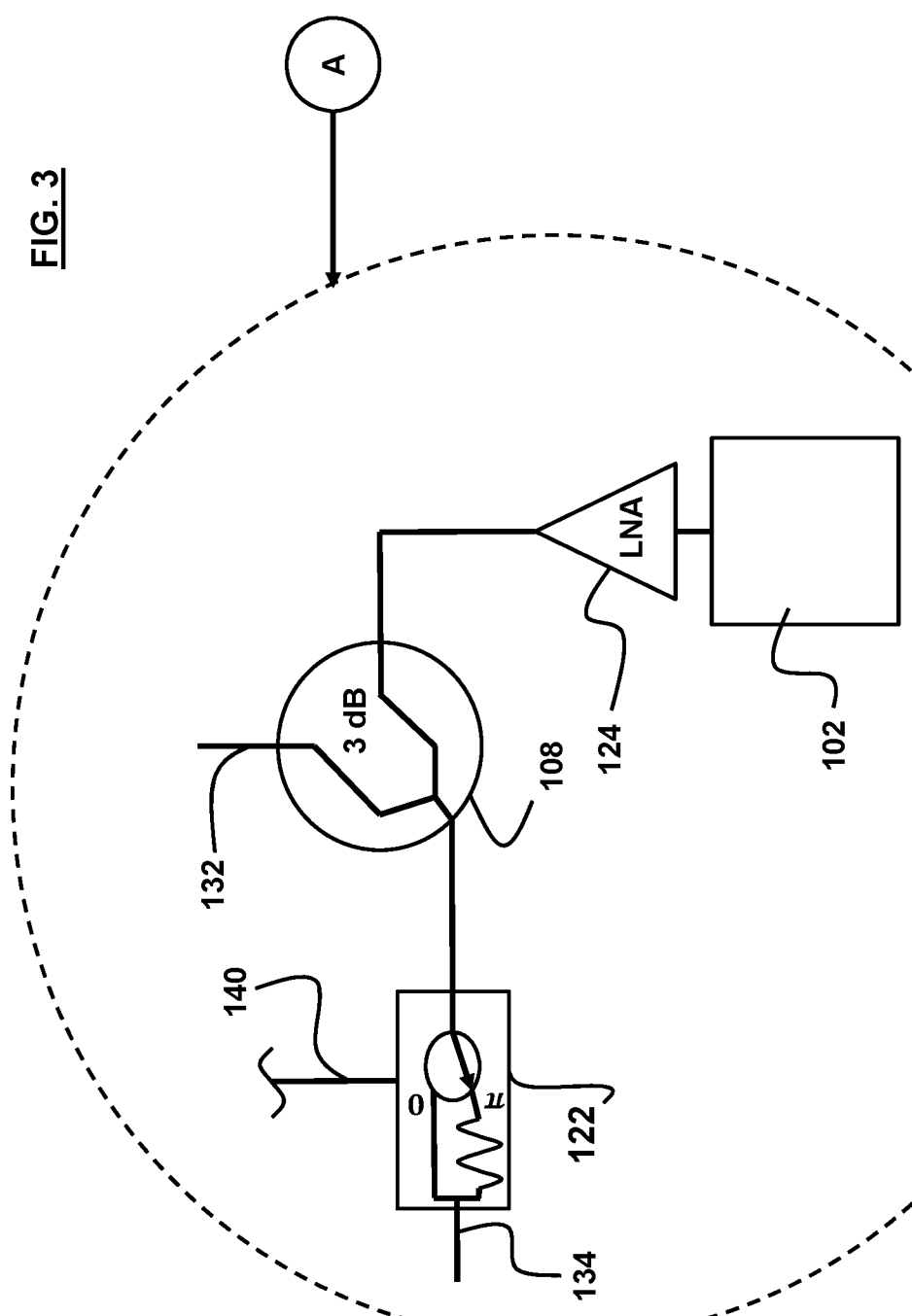
FIG. 3 is a schematic diagram illustrating greater details of the arrangement of the combiner and the phase corrector element for a phased array apparatus, according to an example.
Figure 4:
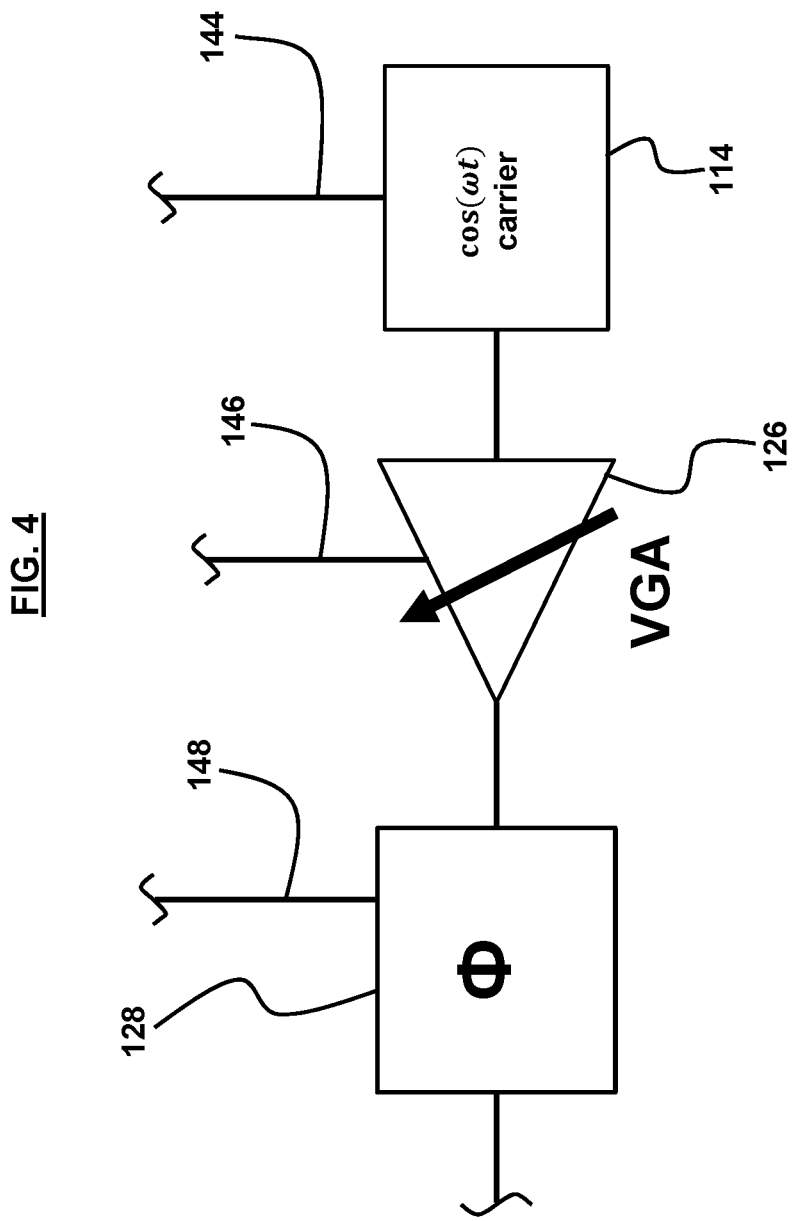
FIG. 4 is a schematic diagram illustrating greater details of the arrangement of the carrier signal generator, the variable gain amplifier, and the phase shifter for providing the carrier signal in a phased array apparatus, according to an example.
Figure 5:
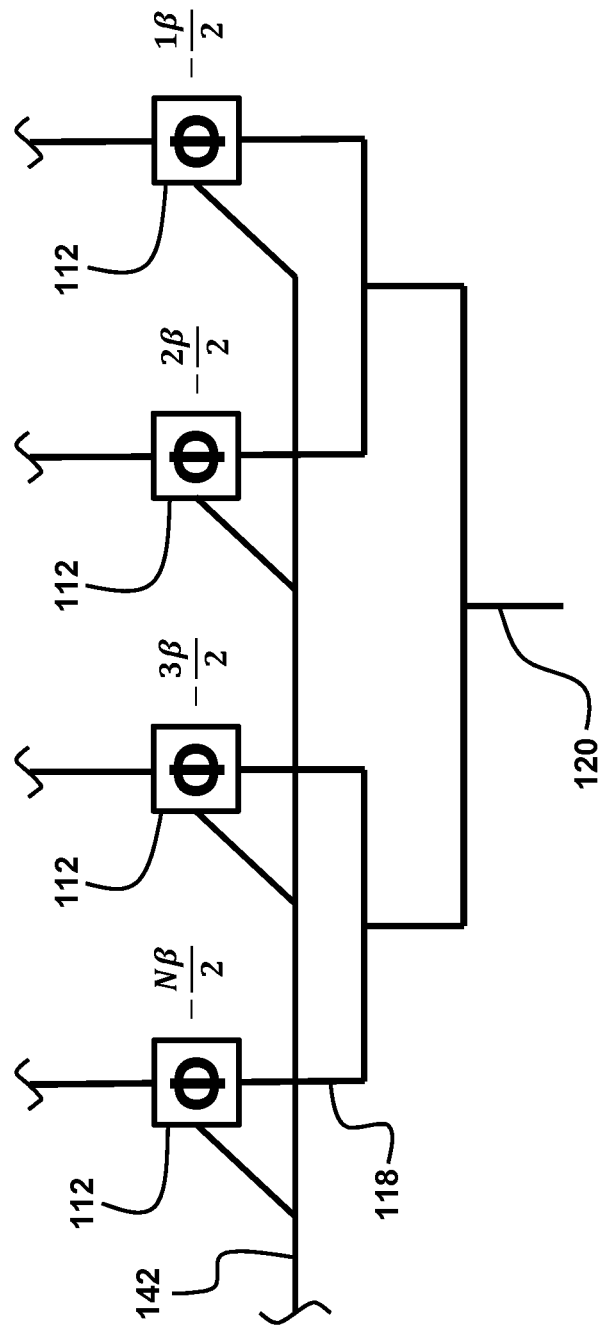
FIG. 5 is a schematic diagram illustrating greater details of the arrangement of the column beam-formers, according to an example.
Figure 6:
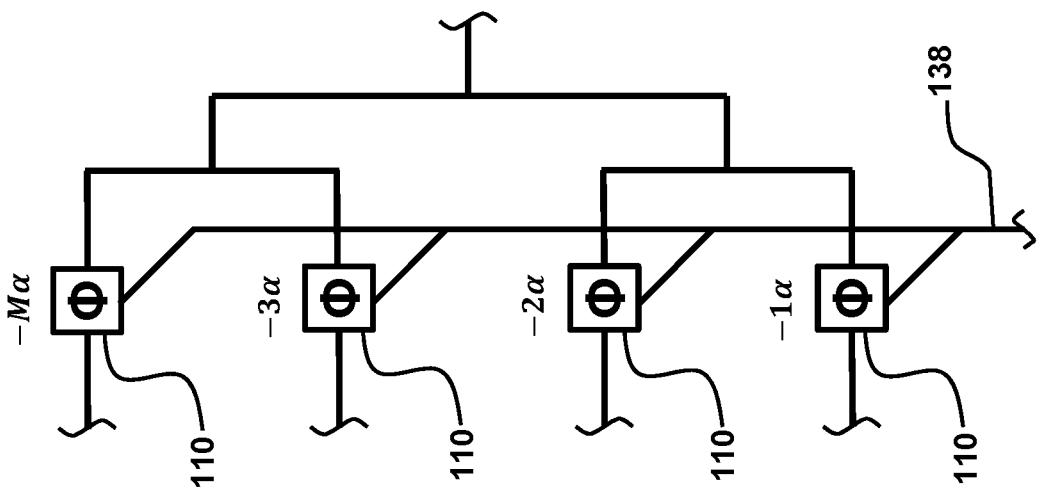
FIG. 6 is a schematic diagram illustrating greater details of the arrangement of the row beam-formers, according to an example.

Embodiments of the disclosed invention, its various features and the advantageous details thereof, are explained more fully with reference to the non-limiting embodiments that are illustrated in the accompanying drawings and detailed in the following description. Descriptions of well-known components and processing techniques are omitted to not unnecessarily obscure what is being disclosed. Examples may be provided and when so provided are intended merely to facilitate an understanding of the ways in which the invention may be practiced and to further enable those of skill in the art to practice its various embodiments. Accordingly, examples should not be construed as limiting the scope of what is disclosed and otherwise claimed.

In the drawings, the size and relative sizes of layers and regions may be exaggerated for clarity. Referring now to the drawings, and more particularly to FIGS. 1 through 9C, where similar reference characters denote corresponding features consistently throughout, there are shown exemplary embodiments. While both the transmit phased array antenna function (described separately in U.S. patent application Ser. No. 15/920,568 filed on Mar. 14, 2018) and receive functions of the present embodiments herein rely on the same mathematical principle of signal summation and have a similar architecture, the following description refers solely to the receiver configuration and operation. The embodiments herein provide an apparatus and method of operation for the receive function or mode of a phased array device such as, for example, a phased array radar or satellite communications antenna with electronic beam steering. The disclosed embodiments can, for example, be used in conjunction with the embodiments for the apparatus and method for the transmit function or mode of a phased array device as disclosed in U.S. patent application Ser. No. 15/920,568 filed on Mar. 14, 2018; U.S. Provisional Patent Application No. 62/478,285 filed on Mar. 29, 2017; U.S. Provisional Patent Application No. 62/492,998 filed on May 2, 2017; and U.S. Provisional Patent Application No. 62/546,018 filed on Aug. 16, 2017; the complete disclosures of which are incorporated herein by reference in their entireties.

A simplified mathematical description of the apparatus and method for the transmit function is shown below to help elucidate the receive function concepts disclosed herein. To explain the transmit function or mode of the phased array use is made of the product-sum identity for the sum of two cosines:

$$\cos(A) + \cos(B) = 2\cos\left(\frac{A+B}{2}\right)\cos\left(\frac{A-B}{2}\right).$$

In a traditional phased array antenna system, which has $N^2$ or MxN beam-formers, each antenna element, which may be a patch antenna for example, is driven by its own dedicated beam-former to transmit a signal given by $\cos(\omega t+(m\alpha+n\beta))$ that is obtained by the dedicated beam-former of the antenna element applying a phase delay or phase or phase shift of $m\alpha+n\beta$ to an input RF signal $\cos(\omega t)$, which is then applied to the corresponding individual antenna element. The progressive row and column phase tapers for a traditional phased array antenna are calculated using $\alpha = K\, d_x \sin(\theta)\cos(\varphi)$ and $\beta = K\, d_y \sin(\theta)\sin(\varphi)$, with the phase shift being applied to each antenna element as $m\alpha+n\beta$ (where m and n are the element row and column positions or indexes, respectively) as has already been mentioned.

In the presently disclosed phased array architecture, which has M+N beam-formers, there are m row beam-formers and n column beam-formers. Each antenna element receives a signal that is the sum of the signal received from its corresponding row beam-former $\cos(\omega t+2m\alpha)$ and the signal received from its corresponding column beam-former $\cos(\omega t+2n\beta)$, which is given by $\cos(\omega t+2m\alpha)+\cos(\omega t+2n\beta)$. Applying the product-sum identity for the sum of two cosines provided above gives the following:

$$\cos(\omega t + 2m\alpha) + \cos(\omega t + 2n\beta) =$$
$$2\cos\left(\frac{(2\omega t + 2m\alpha + 2n\beta)}{2}\right) \times \cos\left(\frac{((\omega t + 2m\alpha) - (\omega t + 2n\beta))}{2}\right) =$$
$$2\cos(m\alpha - n\beta) \times \cos(\omega t + (m\alpha + n\beta)).$$

Thus, it can be seen that applying a progressive phase taper $2m\alpha$ and $2n\beta$ to each row and column of antenna elements, respectively, results in a signal at each antenna element mn that, with the exception of the varying amplitude component $2\cos(m\alpha-n\beta)$, is identical to $\cos(\omega t+(m\alpha+n\beta))$, which is just the signal that would be individually applied to each antenna element in a traditional phased array antenna architecture. Since the amplitude term $2\cos(m\alpha-n\beta)$ can vary in sign, the additional phase inverter function or phase corrector, as also referred to herein, which may be a simple 1-bit phase shifter for example, is added to each antenna element mn to change the amplitude term to a positive value when it is negative.

Now, considering the receive antenna architecture of the embodiments herein, it will be seen that, unlike a traditional phased array receiver, this receive architecture, although based on the same mathematical principles as the transmit architecture, is not simply a reversal of the transmit antenna function.

Therefore, considering the same mathematical principles of signal superposition demonstrated for the transmitter, it can be shown that the receive function can be implemented as a combination of first a sum of the received signal and a carrier signal (of the same center frequency and amplitude, along with the applied phase taper or shift $-m\alpha$) as shown below, and then followed by a second phase taper or shift $$\left(-\frac{n\beta}{2}\right)$$

applied at the other axis (row or column) to the summed signal to extract the desired receive signal (of the correct center frequency and angle of arrival (electronic antenna pointing angle). In this sense, as with a traditional phased array, the receiver acts as a spatial filter.

The signal received from free space at the antenna element mn is, in the case of a radar system for example, the reflected transmitted signal and is expected to have the form $\cos(\omega t+(m\alpha+n\beta))$, and the tapered or phase shifted carrier signal, which has a phase shift of $-m\alpha$, being summed with the received signal at the combiner corresponding to the antenna element mn has the form $\cos(\omega t-m\alpha)$. Therefore, the summation of the received signal and phase shifted carrier signal gives, $$\cos(\omega t+(m\alpha+n\beta))+\cos(\omega t-m\alpha).$$

Again, applying the product-sum identity for the sum of two cosines provided above gives the following:

$$\cos(\omega t + (m\alpha + n\beta)) + \cos(\omega t - m\alpha) =$$

$$2\cos\left(\frac{(2\omega t + n\beta)}{2}\right) \times \cos\left(\frac{(\omega t + (m\alpha + n\beta)) - (\omega t - m\alpha)}{2}\right) =$$

$$2\cos\left(m\alpha + \frac{n\beta}{2}\right) \times \cos\left(\omega t + \frac{n\beta}{2}\right).$$

In similarity to the function of the transmitter, there is a varying amplitude term $$2\cos\left(m\alpha + \frac{n\beta}{2}\right)$$

which also varies randomly in sign, and which also must be corrected (turned positive when negative) by the addition of a phase inverter or phase corrector (1 bit phase shifter) at each antenna element mn. In the second step of the process, the column beam-former for column n applies the phase taper or shift $$-\frac{n\beta}{2}$$

to the summation of the sum of the received signal and phase shifted carrier signal for each element in column n (following the aforementioned possible phase inversion) so that the resulting output of the column beam-former for column n has the general form of cos(ωt). Note therefore, that the second step in the process treats the sums of the elements in each column n together as a linear array to which is applied the phase taper $$-\frac{n\beta}{2}$$

so that the resulting output of the receiver is the sum of these column signals $$\left(\text{phase shifted by } -\frac{n\beta}{2}\right).$$

Also note that the fundamental receiver phase taper values α and β are calculated as before (same as for the transmitter) as $$\alpha = Kd_x\sin(\theta)\cos(\varphi),\ \beta = Kd_y\sin(\theta)\sin(\varphi),\ K = \frac{2\pi}{\lambda},$$

where λ is wavelength, $d_x$ is antenna element spacing in the row direction, $d_y$ is antenna element spacing in the column direction, and (θ, φ) are the spherical coordinate pointing angles of the steerable phased array antenna, wherein $$d_x = d_y = \lambda/2.$$

Figure 8:
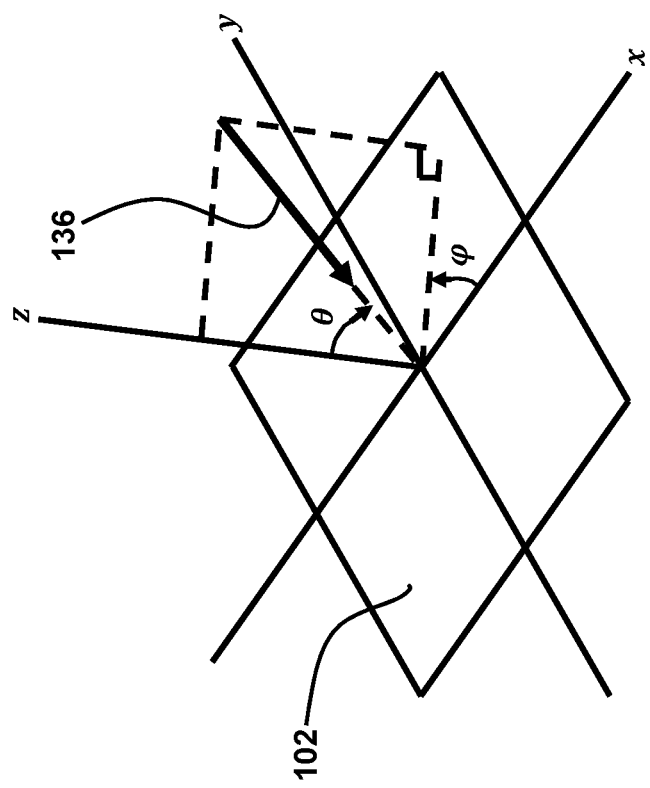
FIG. 8 illustrates how $(\theta, \varphi)$ are defined for an incident ray of RF radiation relative to an antenna element, according to an example.
Figure 9A:
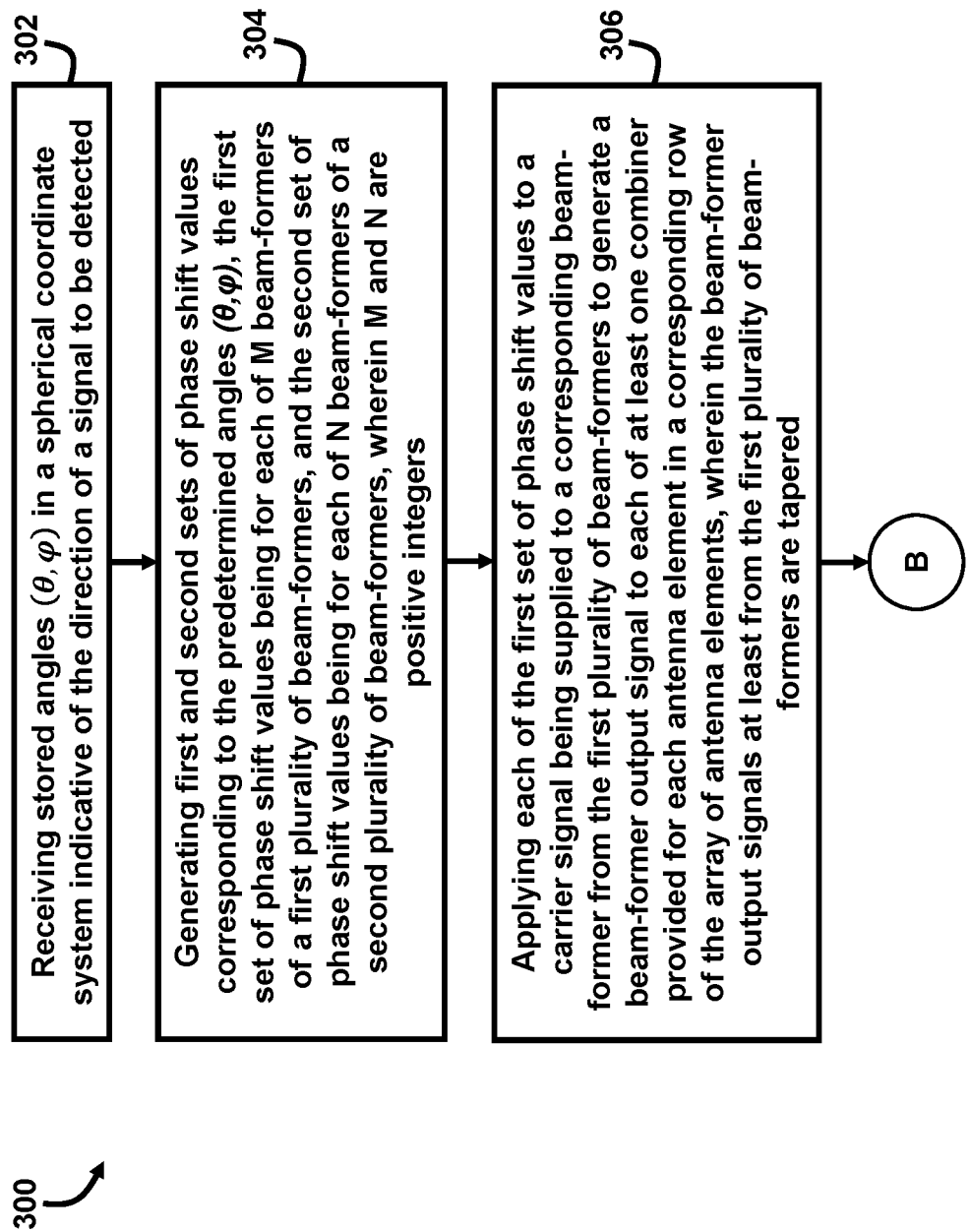
FIGS. 9A through 9C are flow diagrams illustrating a method, according to an example.
Figure 9B:
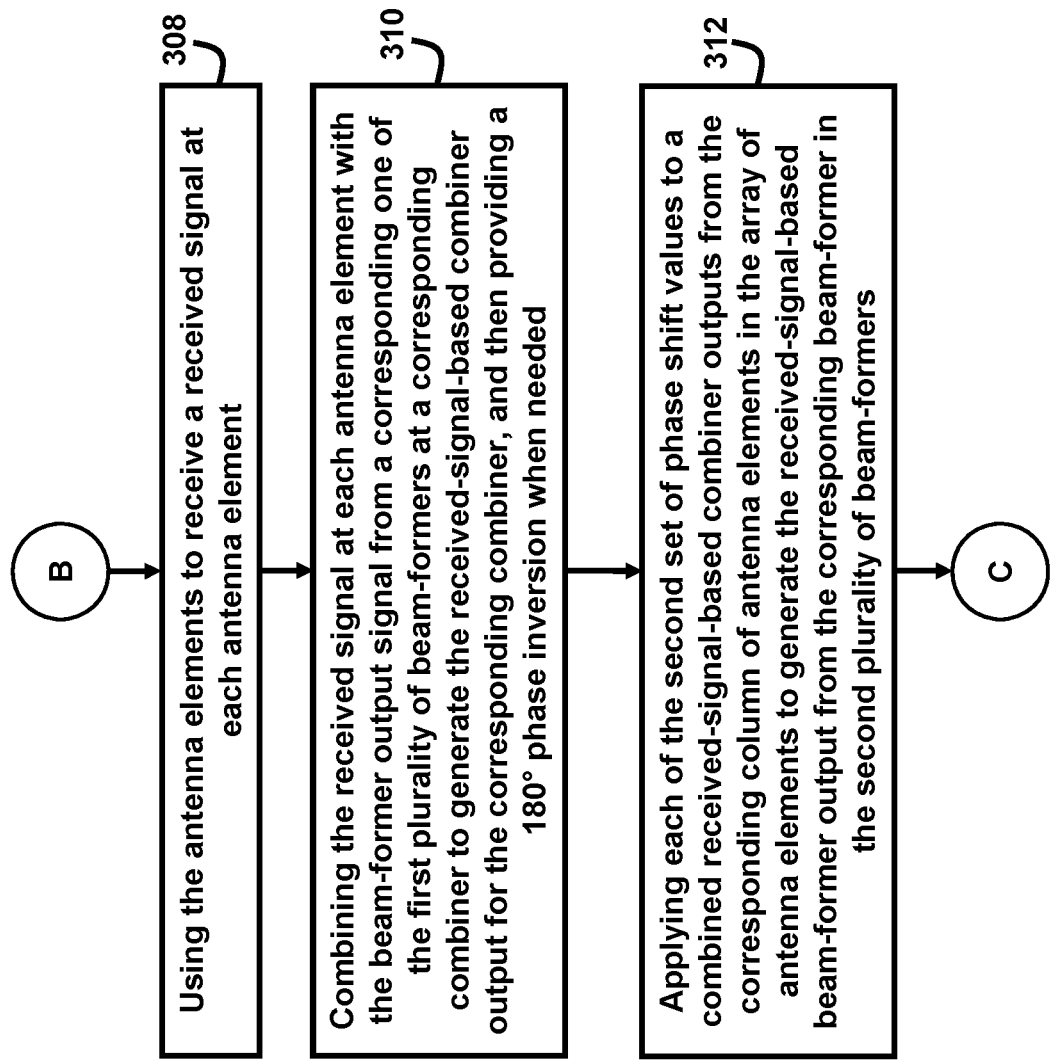
Figure 9C:
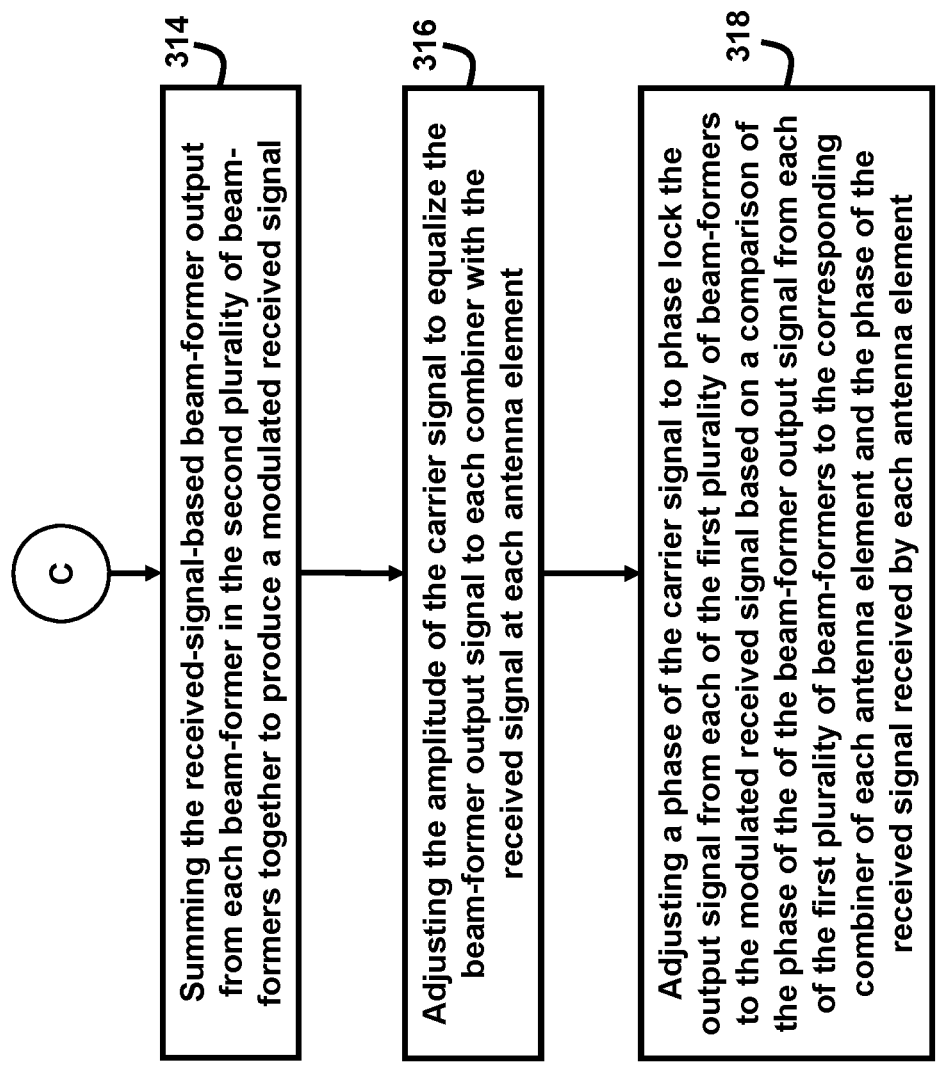

The spherical coordinate pointing angles (θ, φ) are indicative of the direction of the emitted or received RF radiation relative to the antenna elements 102. FIG. 8 illustrates how (θ, φ) are defined for an incident ray 136 of RF radiation relative to an antenna element 102.

The apparatus may further comprise a plurality of first signal paths operatively connecting the first beam-former components to the antenna elements in the corresponding row by equal path lengths; and a plurality of second signal paths operatively connecting the second beam-former components to the antenna elements in the corresponding column by equal path lengths. The signal paths may comprise strip lines or transmission lines. However, the combiner is now configured to have the first of its inputs connected to its corresponding antenna element (to take in the signal received by the antenna element) and the second of its inputs connected to the row (or column) axis to be combined with the generated carrier signal cos(ωt), to which has been applied the first phase taper; i.e., -mα. Now, the other axis is connected to the outputs of its corresponding combiners, and carries the summed signals for each line of said axis. Thus, since signal amplitudes entering each of the inputs on a given combiner must be equal, the amplitude of the generated carrier signal with the phase taper -mα must be adjusted via some type of closed loop control (i.e. similar to a frequency tuner in a radio) so that it combines with the signal received (from free space) on the antenna element at an amplitude equal to that of the desired received signal. When this is achieved, the combined signals on each of the lines of this axis will combine constructively and propagate to the phase shifters on each line of the opposing axis where the proper phase taper $$-\frac{n\beta}{2}$$

will be applied so that these resulting signals will then further constructively combine to generate the desired received signal arriving from the programmed receiver pointing angle. Note that control of the above generated signal amplitude can be simply achieved via a single variable gain amplifier (VGA) placed at the input to the axis m (where the other axis n is on the output side of the combiners) such that its power is split evenly over each first combiner input corresponding to each antenna element. The VGA is therefore tuned (scanned and tracked) until the generated signal (with the -mα phase shift) entering the first leg of each combiner is equal to the amplitude of the desired receive signal at each combiner. Note that it is safe to assume that all of the signals received (from free space) at each antenna element (and therefore entering the second leg of each corresponding combiner) must be of equal amplitude since the received signal is essentially a plane wave arriving over a great distance.

The apparatus may comprise a controller operably connected to each of the row and column beam-former components to generate the phase tapers, and to the phase inverters 122 (also referred to herein as phase correctors) at each element mn to implement a phase inversion when needed, all of which correspond to any commanded receiver pointing angle (θ, φ) and beam pattern.

The first and second beam-former components may employ one of either phase shifters or delay lines component types. The system may comprise a plurality of first signal paths operatively connecting the first beam-former components to the antenna elements in the corresponding row by equal path lengths; and a plurality of second signal paths operatively connecting the second beam-former components to the antenna elements in the corresponding column by equal path lengths. The plurality of first and the second signal paths may comprise a plurality of strip lines or transmission lines.

Another embodiment provides, in an electronically steerable phased array antenna comprising rows and columns of antenna elements and RF signal paths connected thereto, a method comprising receiving a predetermined pointing angle (θ, φ) to steer the steerable phased array antenna; generating first and second phase taper values for each of M rows and N columns of antenna elements encompassed by the steerable phased array antenna, and the additional phase inversion signals (for the combiner output of each element mn), corresponding to the predetermined pointing angle (θ, φ), wherein M and N are positive integers; applying the phase tapers to signals corresponding to each of the M rows and N columns of antenna elements, and the phase inversion signals as required to each of the mn combiner outputs.

The techniques provided by the embodiments herein reduces the cost of manufacturing a phased array antenna because the beamforming hardware and required packaging in the plane of the antenna is typically the most expensive part of antenna manufacturing, and the embodiments herein are able to control the number of beamforming components using the relation (N+M)/(N×M), which continues to provide a cost advantage as the number of antenna elements in the array increases.

The embodiments herein minimize the number of phase control elements (e.g., beamforming components) in the antenna architecture, and thus reduce the packaging density, complexity, and cost of the manufactured phased array antenna. The embodiments herein may be applied to virtually any phased array antenna system, but is particularly useful for high density planar (e.g., radiating patch elements in a single plane) arrays operating at microwave frequencies (e.g., >1 GHz), and comprised of large numbers of patch elements (e.g., 100 to 1000+).

Referring to FIGS. 1 through 8, a phased array apparatus 100 can be seen. The phased array apparatus 100 includes an array of antenna elements 102 arranged in M rows 104 and N columns 106, wherein M and N are positive integers, M corresponds to the number of rows in the array of antenna elements, and N corresponds to the number of columns in the array of antenna elements. Each of the antenna elements 102 may also be identified by mn corresponding to the row and column position, respectively, of the antenna element.

The phased array apparatus 100 further includes a plurality of combiners 108. At least one combiner 108 is provided for each antenna element 102 such that there are at least M×N combiners. The phased array apparatus 100 further includes a first plurality of beam-formers 110 corresponding in number to the number of rows in the array of antenna elements 102 with each of the first plurality of beam-formers being associated with a corresponding row of antenna elements. Each of the first plurality of beam-formers 110 is operatively connected to the combiner 108 for each antenna element 102 in the corresponding row of antenna elements.

The phased array apparatus 100 further includes a second plurality of beam-formers 112 corresponding in number to the number of columns in the array of antenna elements 102 with each of the second plurality of beam-formers being associated with a corresponding column of antenna elements. Each of the second plurality of beam-formers 112 is operatively connected to the combiner 108 for each antenna element 102 in the corresponding column of the array of antenna elements.

The phased array apparatus 100 further includes the carrier signal generator 114 that is operatively connected to the first plurality of beam-formers 110, as shown in the illustrated example.

The phased array apparatus 100 is capable of operating in at least a receiving mode. However, it can be seen that it is possible through a reconfiguration of connections between some components (beamformers 110, 112, combiners 108, and phase correctors 122) to make the apparatus 100 alternately capable of operating in the transmit mode. Such a reconfiguration could be accomplished via the optional inclusion of RF switches (not shown) to implement the reconfiguration in response to commands from the computer-based controller 116 such that the apparatus 100 could be alternately switched between receive and transmit modes.

The carrier signal generator 114 is configured to provide the carrier signal to each of the beam-formers in the first plurality of beam-formers 110. Each combiner 108 produces a received-signal-based output based on the received signal from the corresponding antenna element 102 and the beam-former output from the corresponding beam-former in the first plurality of beam-formers 110. The received-signal-based output from each combiner 108 is directed to a corresponding beam-former in the second plurality of beam-formers 112.

The received-signal-based beam-former output from each beam-former in the second plurality of beam-formers 112 are combined by being summed together to produce the desired received signal 120, also referred to herein as the received total antenna array output signal, of the basic form cos(ωt).

In the illustrated embodiment, each of the beam-formers in the first plurality of beam-formers 110 provides the phase-tapered generated carrier signal 132 to each combiner 108 for each antenna element 102 in the corresponding row of the array of antenna elements 102. Each of the beam-formers in the second plurality of beam-formers 112 receives the summed received-signal-based output from each combiner 108, which in some embodiments phase inverted as necessary by the phase corrector 122 before being summed, in the corresponding column of the array of antenna elements 102 and applies the appropriate phase taper $$\left(\text{i.e. } -\frac{n\beta}{2}\right)$$

to produce the received-signal-based beam-former outputs 118, which are subsequently summed to produce the total desired received signal output 120 from the phased array antenna 100.

The phased array apparatus 100 further comprises a plurality of phase corrector elements 122 corresponding in number to the number (M×N) of antenna elements 102. The received-signal-based output of each combiner 108 has an amplitude function.

Each of the plurality of phase corrector elements 122 is preferably provided in the signal path 134 between the output of the combiner 108, and the one of the second plurality of beam-formers corresponding to its column position in the array of elements 102. Each of the phase corrector elements selectively applies a 180° phase correction to the signal directly output from its corresponding combiner 108 when the amplitude function $$\cos\left(m\alpha + \frac{n\beta}{2}\right)$$

has a negative value. When this function is positive, no phase correction (zero degrees of phase shift) is applied.

The phased array apparatus 100 may in some embodiments further comprise a plurality of low noise amplifiers (LNA) 124 corresponding in number to the number (M×N) of antenna elements 102, where required to improve the signal to noise and G/T performance of the receiver function. The G/T ratio is the ratio of antenna gain to system equivalent noise temperature. G is the antenna gain and T is the system noise temperature, which is the total system noise, including the sky temperature (or ambient noise).

In one embodiment, the phased array apparatus 100 further comprises a variable gain amplifier (VGA) 126. The carrier signal generator 114 is operatively connected to the first plurality of beam-formers 110 via a signal path, and the variable gain amplifier 126 is provided in the signal path between the carrier signal generator 114 and the first plurality of beam-formers 110. The carrier signal has an amplitude, and the received signal received by each antenna element 102 has an amplitude. The beam-former output signal from each of the first plurality of beam-formers 110 to the combiner 108 corresponding to each antenna element 102 also has an amplitude. The variable gain amplifier 126 is configured to adjust the amplitude of the carrier signal such that the amplitude of the beam-former output signal from each of the first plurality of beam-formers 110 to the corresponding combiner 108 of each antenna element 102 equals the amplitude of the desired/intended received signal received by each antenna element 102. The variable gain amplifier 126 may be of the phase invariant type.

In an embodiment, the phased array apparatus 100 may further include a phase shifter 128 provided in the signal path between the carrier signal generator 114 and the first plurality of beam-formers 110, in line with the variable gain amplifier 126. The phase shifter 128 is configured to phase lock the output signal from each of the first plurality of beam-formers 110 to the received signal (signal received by each antenna element 102) based on a comparison of the phase of the beam-former output signal from each of the first plurality of beam-formers 110 and the phase of the received signal received by each antenna element 102.

In an embodiment, the first plurality of beam-formers 110 are configured to taper the carrier signal over the rows of the array of antenna elements 102 by each of the first plurality of beam-formers 110 introducing a phase shift of $-m\alpha$ to the carrier signal 114 it receives such that each of the beam-formers 110 in the first plurality of beam-formers provides a corresponding beam-former output signal to one of the inputs to each combiner 108 for each antenna element 102 in the corresponding row 104 of the array of antenna elements that is phase shifted by $-m\alpha$ relative to the common carrier signal 114 supplied to the inputs of each of the first plurality of beam-formers 110. Each row 104 of the array of antenna elements 102 is identified by a sequential row index m, wherein m is an integer in the range $$1 \le m \le M,\ \alpha = K d_x \sin(\theta)\cos(\varphi),\ K = \frac{2\pi}{\lambda},\ d_x = \lambda/2,$$

$\lambda$ is the wavelength of the carrier signal, $d_x$ is the spacing between the antenna elements in each row, and $(\theta, \varphi)$ are the angles in a spherical coordinate system for the direction of arrival of the desired/intended signal to be received by the phased array apparatus.

In an embodiment, each of the second plurality of beam-formers 112 is configured to receive the received-signal-based output from each combiner 108 in a corresponding column 106 of the array of antenna elements 102 and introduce a phase shift of $-n\beta/2$ to a column output signal formed by combining the received-signal-based outputs it receives from the combiners 108 in the corresponding column 106 of the array of antenna elements 102 so as to produce a phase-shifted column output signal 118 that is phase shifted by $-n\beta/2$ relative to the column output signal formed by combining the received-signal-based outputs from the combiners 108 in the corresponding column 106. Each column 106 of the array of antenna elements 102 is identified by a sequential column index n, wherein n is an integer in the range $$1 \le n \le N,\ \beta = K d_y \sin(\theta)\sin(\varphi),\ K = \frac{2\pi}{\lambda},\ d_y = \lambda/2,$$

$\lambda$ is the wavelength of the carrier signal, $d_y$ is the spacing between the antenna elements in each row, and $(\theta, \varphi)$ are the angles in a spherical coordinate system for the direction of arrival of the desired/intended signal to be received by the phased array apparatus.

In an embodiment, the phased array apparatus 100 is part of a phased array system 130 that includes a computer-based controller 116. The controller 116 at least in part uses the direction angles $(\theta, \varphi)$ in a spherical coordinate system for the direction of arrival of the desired/intended signal to be received by the phased array apparatus, also referred to herein as the desired/intended receive signal, or for the direction from which detection is desired, and the wavelength of the carrier signal, which is expected to be at least approximately the same as the wavelength of the received signal received by the antenna elements 102, to generate phase shift values to be applied to the carrier signal in each of the first plurality of beam-formers 110.

The controller 116 at least in part uses the direction angles $(\theta, \varphi)$ in a spherical coordinate system for the direction of arrival of the desired/intended signal to be received by the phased array apparatus, or for the direction from which detection is desired, and the wavelength of the carrier signal to generate phase shift values to be applied to a corresponding column output signal, formed by combining the received-signal-based outputs of the combiners 108 in the corresponding column 106, in each of the second plurality of beam-formers 112.

In an embodiment, the phased array apparatus 100 and system 130 include a plurality of first signal paths 132 operatively connecting the first plurality of beam-formers 110 to the combiners 108 of the antenna elements 102 in the corresponding row 104 by equal path lengths. The phased array apparatus 100 and system 130 also include a plurality of second signal paths 134 operatively connecting the second plurality of beam-formers 112 to the combiners 108 of the antenna elements 102 in the corresponding column 106 by equal path lengths. In some embodiments, the plurality of first and the second signal paths comprise a plurality of strip lines or transmission lines.

In an embodiment, the phased array system 130 further includes a variable gain amplifier 126, wherein the carrier signal generator 114 is operatively connected to the first plurality of beam-formers 110 via a signal path, and the variable gain amplifier 126 is provided in the signal path between the carrier signal generator 114 and the first plurality of beam-formers 110. The carrier signal, the received signal received by each antenna element 102, and the beam-former output signal from each of the first plurality of beam-formers 110 to the corresponding combiner 108 of each antenna element 102 each have a respective amplitude. The variable gain amplifier 126 is configured to adjust the amplitude of the carrier signal, under control of the controller 116, such that the amplitude of the beam-former output signal from each of the first plurality of beam-formers 110 to the corresponding combiner 108 for each antenna element 102 equals the amplitude of the received signal received by each antenna element 102.

Figure 7:
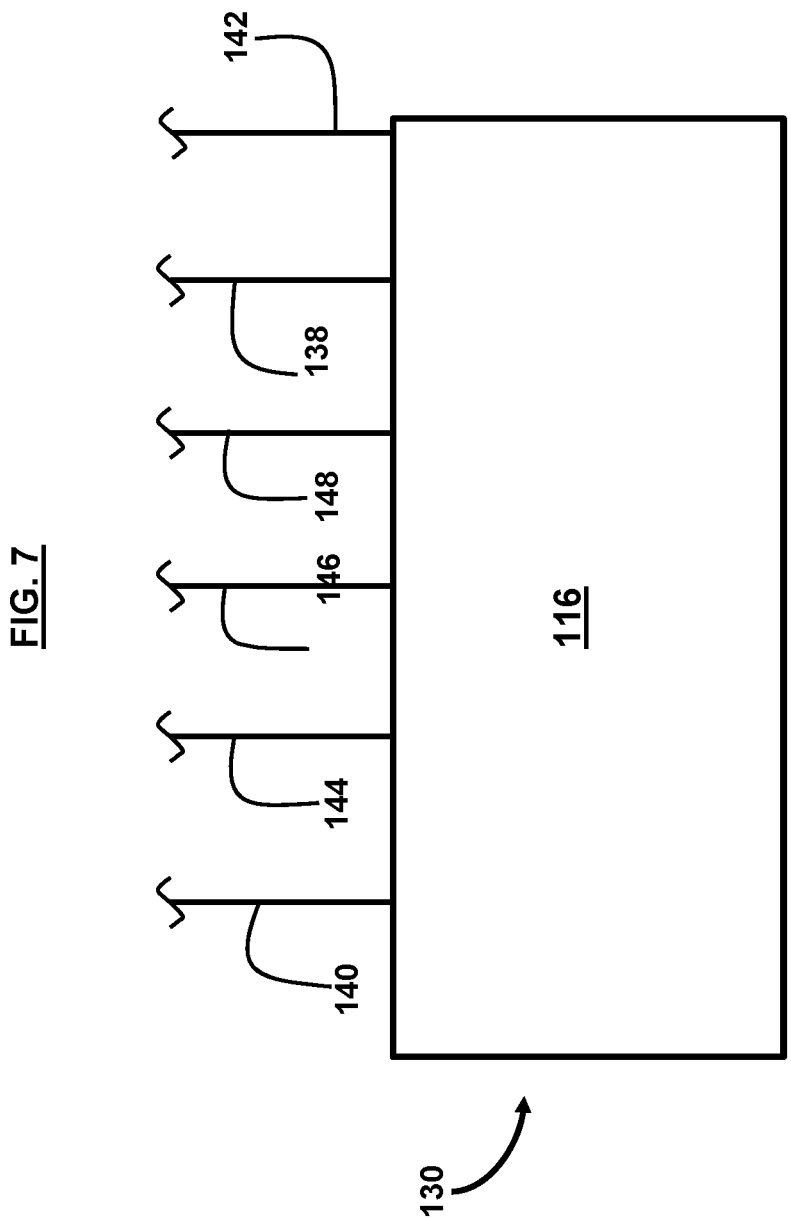
FIG. 7 is a schematic diagram illustrating a controller for a phased array apparatus, according to an example.

A controller 116, such as the one shown in FIG. 7, may be operably connected to each of the pluralities of beam-formers 110, 112, the variable gain amplifier 126, phase shifter 128, and the phase corrector element 122 to calculate the phase shifts for the beam-formers 110, 112, as well as set variable carrier signal amplitudes and switch in (0 or) 180° phase corrections, as needed for each of the antenna elements 102 associated with any commanded pointing angle (θ, φ). In an example, the controller 116 may be any type of computer, processor, microcontroller, application specific processor, application specific integrated circuit, or digital signal processor. A phase correction provided by the phase corrector element 122 may be selectable to either 0 or πradians, according to an example. According to some examples, the beam-formers 110, 112 may comprise one of either a traditional MMIC phase shifter or switchable delay line module of the appropriate resolution; typically 4 to 8 bits (16 to 256 states). The outline of the antenna element 102 in its simplest form comprises a continuous electrically conductive patch that, combined with an underlying adjacent dielectric layer, followed by a conformal ground plane layer forms the component that is capable of receiving RF energy from free space. In some examples, the antenna element 102 may also radiate RF energy into free space in a transmit mode. In such examples, the controller 116 may also control mode switching between a receive mode and a transmit mode, if necessary. The carrier signal generator 114 is also controlled by the controller 116, which can vary the carrier signal frequency directly and the amplitude and phase of the carrier signal directly, through the variable gain amplifier 126 and the phase shifter 128 (if included), or both. The dimension of each side of the patch perimeter should ideally be about ½ the wavelength of the carrier signal. In the drawings, the square outline denoting the antenna element 102 constitutes the radiating metallic patch itself. The combiners 108, phase corrector element 122, and the low noise amplifiers 124 shown in the expanded view are components that are configured to have a smaller size than the footprint of the antenna element 102, and are attached to the back (e.g., non-radiating and/or non-receiving) side of the antenna element 102. The carrier signal is a radio frequency (RF) signal. The combiner 108 may be a (2:1) Wilkinson combiner.

The controller 116 is operably connected to each of the pluralities of beam-formers 110, 112, the variable gain amplifier 126, phase shifter 128, and the phase corrector element 122 via control lines 138, 142, 146, 148, and 140, respectively, in order to communicate control signals, control instructions, commands, and data to these devices and any associated switches or dedicated controllers internal to the devices. The controller 116 is operably connected to the carrier signal generator 114 via the control line 144 in order to control its functions. The control lines may, for example, be a parallel or serial data connection.

An embodiment also includes a method 300 for operating a phased array system 130 that includes at least an array of antenna elements 102, disposed in rows and columns, and RF signal paths connected the antenna elements. The method 300 is provided in FIGS. 9A, 9B, and 9C, with reference to FIGS. 1 through 8. The method 300 comprises receiving (302) a stored angles (θ, φ) in a spherical coordinate system indicative of the direction of a signal to be detected; generating (304) first and second sets of phase shift values corresponding to the predetermined angles (θ, φ), the first set of phase shift values being for each of M beam-formers of a first plurality of beam-formers 110, and the second set of phase shift values being for each of N beam-formers of a second plurality of beam-formers 112, wherein M and N are positive integers; applying (306) each of the first set of phase shift values to a carrier signal being supplied to a corresponding beam-former from the first plurality of beam-formers 110 to generate a beam-former output signal to each of at least one combiner 108 provided for each antenna element 102 in a corresponding row 104 of the array of antenna elements, wherein the beam-former output signals at least from the first plurality of beam-formers 110 are tapered; using (308) the antenna elements 102 to receive a received signal at each antenna element; combining (310) the received signal at each antenna element 102 with the beam-former output signal from a corresponding one of the first plurality of beam-formers 110 at a corresponding combiner 108 to generate the received-signal-based combiner output for the corresponding combiner 108, and then providing a 180° phase inversion when needed; applying (312) each of the second set of phase shift values to a combined received-signal-based combiner outputs from the corresponding column 106 of antenna elements 102 in the array of antenna elements to generate the received-signal-based beam-former output 118 from the corresponding beam-former in the second plurality of beam-formers 112; summing (314) the received-signal-based beam-former output from each beam-former in the second plurality of beam-formers 112 together to produce a modulated received signal 120; and adjusting (316) the amplitude of the carrier signal to equalize the beam-former output signal to each combiner 108 with the received signal at each antenna element 102; and adjusting the phase of the carrier signal to phase lock the output signal from each of the first plurality of beam-formers to the received signal (received by each antenna element) based on a comparison of the phase of the beam-former output signal from each of the first plurality of beam-formers to the corresponding phase of the received signal received by each antenna element.

According to an example, the first set of phase shift values are given by −mα, wherein m is the row number in the array of antenna elements for the row in which the corresponding row of antenna elements are disposed, wherein m is an integer in the range $$1 \leq m \leq M, \alpha = Kd_x\sin(\theta)\cos(\varphi), K = \frac{2\pi}{\lambda}, d_x = \lambda/2,$$

λ is the wavelength of the carrier signal, and $d_x$ is the spacing between the antenna elements in each row; and the second set of phase shift values are given by −nβ/2, wherein n is the column number in the array of antenna elements for the column in which the corresponding column of antenna elements are disposed, wherein n is an integer in the range $$1 \le n \le N, \beta = K d_y \sin(\theta)\sin(\varphi), K = \frac{2\pi}{\lambda}, d_y = \lambda/2,$$

λ is the wavelength of the carrier signal, and $d_y$ is the spacing between the antenna elements in each column.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Those skilled in the art will recognize that the embodiments herein can be practiced with modification within the spirit and scope of the appended claims.

What is claimed is:

1. A phased array apparatus comprising:
an array of antenna elements arranged in M rows and N columns, wherein M and N are positive integers, M corresponds to the number of rows in the array of antenna elements, and N corresponds to the number of columns in the array of antenna elements;
a plurality of combiners, each of the plurality of combiners being a 2:1 RF signal combiner having at least a first input, a second input, and an output, at least one of the plurality of combiners being provided for each antenna element such that there are at least M×N combiners;
a first plurality of beam-formers corresponding in number to the number of rows in the array of antenna elements with each of the first plurality of beam-formers being associated with a corresponding row of antenna elements, each of the first plurality of beam-formers being operatively connected to the first input of the combiner for each antenna element in the corresponding row of antenna elements, and each antenna element being operatively connected to the second input of its respective combiner;
a second plurality of beam-formers corresponding in number to the number of columns in the array of antenna elements with each of the second plurality of beam-formers being associated with a corresponding column of antenna elements, each of the second plurality of beam-formers being operatively connected to the output of the combiner for each antenna element in the corresponding column of antenna elements; and
at least one carrier signal generator operatively connected to the first plurality of beam-formers,
wherein the phased array apparatus is capable of operating in at least a receiving mode, wherein the carrier signal generator is configured to provide the carrier signal to each of the beam-formers in the first plurality of beam-formers, wherein each of the beam-formers in the first plurality of beam-formers provides a corresponding beam-former output signal to the first input of each combiner for each antenna element in the corresponding row of the array of antenna elements, wherein each of the antenna elements is operatively connected to the second input of its corresponding combiner, wherein each of the antenna elements is configured to at least receive at least a portion of a desired/intended signal to be received by the phased array apparatus, and incident on the array of antenna elements, and to provide a resulting received signal to its corresponding combiner,
wherein each combiner produces a received-signal-based output based on the received signal from the corresponding antenna and the beam-former output from the corresponding beam-former in the first plurality of beam-formers, wherein the received-signal-based output from each combiner is directed to a corresponding beam-former in the second plurality of beam-formers, wherein each of the beam-formers in the second plurality of beam-formers receives the summed received-signal-based outputs from the combiners in the corresponding column of the array of antenna elements and produces a received-signal-based beam-former output, and
wherein the received-signal-based beam-former output from each beam-former in the second plurality of beam-formers are summed together to produce a received total antenna array output signal.

2. The phased array apparatus according to claim 1, further comprising a plurality of phase corrector elements corresponding in number to the number (M×N) of antenna elements, wherein the received-signal-based output of each combiner has an amplitude function, wherein each of the combiner outputs is operatively connected to the beam-former for its corresponding column of the array of antenna elements via a signal path, wherein each of the plurality of phase corrector elements is provided in the signal path between the corresponding combiner output and the beam-former for the corresponding column of the array of antenna elements, and wherein each of the phase corrector elements selectively applies a 180° phase inversion to the output of its corresponding combiner when the amplitude function of the received-signal-based output of its corresponding combiner has a negative value.

3. The phased array apparatus according to claim 1, further comprising a plurality of low noise amplifiers corresponding in number to the number (M×N) of antenna elements, wherein each of the antenna elements is operatively connected to its corresponding combiner via a signal path, wherein each of the plurality of low noise amplifiers is provided in the signal path between the corresponding antenna element and its corresponding combiner.

4. The phased array apparatus according to claim 1, further comprising a variable gain amplifier, wherein the carrier signal generator is operatively connected to the first plurality of beam-formers via a signal path, the variable gain amplifier being provided in the signal path between the carrier signal generator and the first plurality of beam-formers, wherein the carrier signal has an amplitude, wherein the received signal received by each antenna element has an amplitude, wherein the beam-former output signal from each of the first plurality of beam-formers to the corresponding combiner of each antenna element has an amplitude, and wherein the variable gain amplifier is configured to adjust the amplitude of the carrier signal such that the amplitude of the beam-former output signal from each of the first plurality of beam-formers to the corresponding combiner of each antenna element equals the amplitude of the received signal received by each antenna element.

5. The phased array apparatus according to claim 4, further comprising a phase shifter provided in the signal path between the carrier signal generator and the first plurality of beam-formers, in line with the variable gain amplifier, wherein the carrier signal has a phase, wherein the received signal received by each antenna element has a corresponding phase, wherein the beam-former output signal from each of the first plurality of beam-formers to the corresponding combiner of each antenna element has a corresponding phase, and wherein the phase shifter is configured to phase lock the output signal from each of the first plurality of beam-formers to the received total antenna array output signal based on a comparison of the phase of the of the beam-former output signal from each of the first plurality of beam-formers to the corresponding combiner of each antenna element and the phase of the received signal outputted by each antenna element.

6. The phased array apparatus according to claim 1, wherein the first plurality of beam-formers are configured to taper the carrier signal over the rows of the array of antenna elements by each of the first plurality of beam-formers introducing a phase shift of $-m\alpha$ to the carrier signal it receives such that each of the beam-formers in the first plurality of beam-formers provides a corresponding beam-former output signal to each combiner for each antenna element in the corresponding row of the array of antenna elements that is phase shifted by $-m\alpha$, wherein each row of the array of antenna elements is identified by a sequential row index m, wherein m is an integer in the range $$1 \leq m \leq M, \alpha = Kd_x\sin(\theta)\cos(\varphi), K = \frac{2\pi}{\lambda}, d_x = \lambda/2,$$

$\lambda$ is the wavelength of the carrier signal, $d_x$ is the spacing between the antenna elements in each row, and $(\theta, \varphi)$ are the angles in a spherical coordinate system for the direction of arrival of the desired/intended signal to be received by the phased array apparatus.

7. The phased array apparatus according to claim 6, wherein each of the second plurality of beam-formers are configured to receive the received-signal-based output from each combiner in a corresponding column of the array of antenna elements and introduce a phase shift of $-n\beta/2$ to a column output signal formed by combining the received-signal-based outputs it receives from the combiners in the corresponding column of the array of antenna elements so as to produce a phase-shifted column output signal that is phase shifted by $-n\beta/2$, wherein each column of the array of antenna elements is identified by a sequential column index n, wherein n is an integer in the range $$1 \leq n \leq N, \beta = Kd_y\sin(\theta)\sin(\varphi), K = \frac{2\pi}{\lambda}, d_y = \lambda/2,$$

$\lambda$ is the wavelength of the carrier signal, $d_y$ is the spacing between the antenna elements in each column, and $(\theta, \varphi)$ are the angles in a spherical coordinate system for the direction of arrival of the desired/intended signal to be received by the phased array apparatus.

8. The phased array apparatus according to claim 1, wherein each of the second plurality of beam-formers are configured to receive the received-signal-based output from each combiner in a corresponding column of the array of antenna elements and introduce a phase shift of $-n\beta/2$ to a column output signal formed by combining the received-signal-based outputs it receives from the combiners in the corresponding column of the array of antenna elements so as to produce a phase-shifted column output signal that is phase shifted by $-n\beta/2$, wherein each column of the array of antenna elements is identified by a sequential column index n, wherein n is an integer in the range $$1 \leq n \leq N, \beta = Kd_y\sin(\theta)\sin(\varphi), K = \frac{2\pi}{\lambda}, d_y = \lambda/2,$$

$\lambda$ is the wavelength of the carrier signal, $d_y$ is the spacing between the antenna elements in each column, and $(\theta, \varphi)$ are the angles in a spherical coordinate system for the direction of arrival of the desired/intended signal to be received by the phased array apparatus.

9. A phased array system comprising:
a phased array apparatus and a controller therefor, wherein the phased array apparatus comprises:
a plurality of antenna elements disposed in a predetermined number of rows M and a predetermined number of columns N to form an array of antenna elements, wherein M and N are positive integers;
a plurality of combiners, each of the plurality of combiners being a 2:1 RF signal combiner having at least a first input, a second input, and an output, at least one of the plurality of combiners being provided for each antenna element such that there are at least M×N combiners;
a first plurality of beam-formers corresponding in number to the number of rows in the array of antenna elements with each of the first plurality of beam-formers being associated with a corresponding row of antenna elements, each of the first plurality of beam-formers being operatively connected to the first input of the combiner for each antenna element in the corresponding row of antenna elements;
a second plurality of beam-formers corresponding in number to the number of columns in the array of antenna elements with each of the second plurality of beam-formers being associated with a corresponding column of antenna elements, each of the second plurality of beam-formers being operatively connected to the output of the combiner for each antenna element in the corresponding column of antenna elements; and
at least one carrier signal generator operatively connected to the first plurality of beam-formers,
wherein the phased array apparatus is capable of operating in at least a receiving mode, wherein the carrier signal generator is configured to provide the carrier signal to each of the beam-formers in the first plurality of beam-formers, wherein each of the beam-formers in the first plurality of beam-formers provides a corresponding beam-former output signal to the first input of each combiner for each antenna element in the corresponding row of the array of antenna elements, wherein each of the antenna elements is operatively connected to the second input of its corresponding combiner, wherein each of the antenna elements is configured to at least receive a received signal and provide the received signal to its corresponding combiner,
wherein each combiner produces a received-signal-based output based on the received signal from the corresponding antenna and the beam-former output from the corresponding beam-former in the first plurality of beam-formers, wherein the received-signal-based output from each combiner is directed to a corresponding beam-former in the second plurality of beam-formers, wherein each of the beam-formers in the second plurality of beam-formers receives the summed total of the received-signal-based outputs from the combiners in the corresponding column of the array of antenna elements, and produces a received-signal-based beam-former output, wherein the received-signal-based beam-former output from each beam-former in the second plurality of beam-formers are summed together produce a received total antenna array output signal, wherein the carrier signal has a wavelength, and wherein the controller at least in part uses the direction angles (θ, φ) in a spherical coordinate system for the direction of arrival of the desired/intended signal to be received by the phased array apparatus, or for the direction from which detection is desired, and the wavelength of the carrier signal to generate phase shift values to be applied to the carrier signal in each of the first plurality of beam-formers.

10. The phased array system according to claim 9, further comprising a plurality of phase corrector elements corresponding in number to the number (M×N) of antenna elements, wherein the received-signal-based output of each combiner has an amplitude function, wherein each of the combiner outputs is operatively connected to the beam-former for its corresponding column of the array of antenna elements via a signal path, wherein each of the plurality of phase corrector elements is provided in the signal path between the corresponding combiner output and the beam-former for the corresponding column of the array of antenna elements, and wherein each of the phase corrector elements selectively applies a 180° phase inversion to the output of its corresponding combiner when the amplitude function of the received-signal-based output of its corresponding combiner has a negative value.

11. The system of claim 9, comprising:
a plurality of first signal paths operatively connecting each of the first plurality of beam-formers to the first input of each of the combiners in the corresponding row by equal path lengths; and
a plurality of second signal paths operatively connecting each of the second plurality of beam-formers to the output of each of the combiners in the corresponding column by equal path lengths.

12. The system of claim 11, wherein the plurality of first and the second signal paths comprise a plurality of radio frequency (RF) strip lines or transmission lines.

13. The phased array system according to claim 9, further comprising a variable gain amplifier, wherein the carrier signal generator is operatively connected to the first plurality of beam-formers via a signal path, the variable gain amplifier being provided in the signal path between the carrier signal generator and the first plurality of beam-formers, wherein the carrier signal has an amplitude, wherein the received signal received by each antenna element has an amplitude, wherein the beam-former output signal from each of the first plurality of beam-formers to the corresponding combiner of each antenna element has an amplitude, and wherein the variable gain amplifier is configured to adjust the amplitude of the carrier signal, under control of the controller, such that the amplitude of the beam-former output signal from each of the first plurality of beam-formers to the corresponding combiner of each antenna element equals the amplitude of the received signal received by each antenna element.

14. The phased array system according to claim 13, further comprising a phase shifter provided in the signal path between the carrier signal generator and the first plurality of beam-formers, in line with the variable gain amplifier, wherein the carrier signal has a phase, wherein the received signal received by each antenna element has a corresponding phase, wherein the beam-former output signal from each of the first plurality of beam-formers to the corresponding combiner of each antenna element has a corresponding phase, and wherein the phase shifter is configured to phase lock, under control of the controller, the output signal from each of the first plurality of beam-formers to the received total antenna array output signal based on a comparison of the phase of the of the beam-former output signal from each of the first plurality of beam-formers to the corresponding combiner of each antenna element and the phase of the received signal outputted by each antenna element.

15. The phased array system according to claim 9, wherein the first plurality of beam-formers are configured to taper the carrier signal over the rows of the array of antenna elements by each of the first plurality of beam-formers introducing a phase shift of −mα to the carrier signal it receives such that each of the beam-formers in the first plurality of beam-formers provides a corresponding beam-former output signal to each combiner for each antenna element in the corresponding row of the array of antenna elements that is phase shifted by −mα, wherein each row of the array of antenna elements is identified by a sequential row index m, wherein m is an integer in the range $$1 \le m \le M, \ \alpha = Kd_x\sin(\theta)\cos(\varphi), \ K = \frac{2\pi}{\lambda}, \ d_x = \lambda/2,$$

λ is the wavelength of the carrier signal, $d_x$ is the spacing between the antenna elements in each row, and (θ, φ) are the angles in a spherical coordinate system for the direction of arrival of the desired/intended signal to be received by the phased array system.

16. The phased array system according to claim 15, wherein each of the second plurality of beam-formers are configured to receive the received-signal-based output from each combiner in a corresponding column of the array of antenna elements and introduce a phase shift of −nβ/2 to a column output signal formed by combining the received-signal-based outputs it receives from the combiners in the corresponding column of the array of antenna elements so as to produce a phase-shifted column output signal that is phase shifted by −nβ/2, wherein each column of the array of antenna elements is identified by a sequential column index n, wherein n is an integer in the range $$1 \le n \le N, \ \beta = Kd_y\sin(\theta)\sin(\varphi), \ K = \frac{2\pi}{\lambda}, \ d_y = \lambda/2,$$

λ is the wavelength of the carrier signal, $d_y$ is the spacing between the antenna elements in each column, and (θ, φ) are the angles in a spherical coordinate system for the direction of arrival of the desired/intended signal to be received by the phased array system.

17. The phased array system according to claim 9, wherein each of the second plurality of beam-formers are configured to receive the received-signal-based output from each combiner in a corresponding column of the array of antenna elements and introduce a phase shift of −nβ/2 to a column output signal formed by combining the received-signal-based outputs it receives from the combiners in the corresponding column of the array of antenna elements so as to produce a phase-shifted column output signal that is phase shifted by $-n\beta/2$, wherein each column of the array of antenna elements is identified by a sequential column index n, wherein n is an integer in the range $$1 \le n \le N, \beta = Kd_y\sin(\theta)\sin(\varphi), K = \frac{2\pi}{\lambda}, d_y = \lambda/2,$$

$\lambda$ is the wavelength of the carrier signal, $d_y$ is the spacing between the antenna elements in each column, and $(\theta, \varphi)$ are the angles in a spherical coordinate system for the direction of arrival of the desired/intended signal to be received by the phased array apparatus.

18. In a phased array system comprising an array of antenna elements disposed in rows and columns and RF signal paths connected thereto, a method comprising:
receiving stored angles $(\theta, \varphi)$ in a spherical coordinate system indicative of the direction of a signal to be detected;
generating first and second sets of phase shift values corresponding to the predetermined angles $(\theta, \varphi)$, the first set of phase shift values being for each of M beam-formers of a first plurality of beam-formers, and the second set of phase shift values being for each of N beam-formers of a second plurality of beam-formers, wherein M and N are positive integers;
applying each of the first set of phase shift values to a carrier signal being supplied to a corresponding beam-former from the first plurality of beam-formers to generate a beam-former output signal to each of at least one combiner provided for each antenna element in a corresponding row of the array of antenna elements, wherein the beam-former output signals at least from the first plurality of beam-formers are tapered;
using the antenna elements to receive a received signal at each antenna element;
combining the received signal at each antenna element with the beam-former output signal from a corresponding one of the first plurality of beam-formers at a corresponding combiner to generate the received-signal-based combiner output for the corresponding combiner;
applying each of the second set of phase shift values to a combined received-signal-based combiner outputs from the corresponding column of antenna elements in the array of antenna elements to generate the received-signal-based beam-former output from the corresponding beam-former in the second plurality of beam-formers;
summing the received-signal-based beam-former output from each beam-former in the second plurality of beam-formers together to produce a received total antenna array output signal; and
adjusting the amplitude of the carrier signal to equalize the beam-former output signal to each combiner with the received signal at each antenna element.

19. The method of claim 18, wherein:
the first set of phase shift values are given by $-m\alpha$, wherein m is the row number in the array of antenna elements for the row in which the corresponding row of antenna elements are disposed, wherein m is an integer in the range $$1 \le m \le M, \alpha = Kd_x\sin(\theta)\cos(\varphi), K = \frac{2\pi}{\lambda}, d_x = \lambda/2,$$

$\lambda$ is the wavelength of the carrier signal, and $d_x$ is the spacing between the antenna elements in each row; and
the second set of phase shift values are given by $-\beta n/2$, wherein n is the column number in the array of antenna elements for the column in which the corresponding column of antenna elements are disposed, wherein n is an integer in the range $$1 \le n \le N, \beta = Kd_y\sin(\theta)\sin(\varphi), K = \frac{2\pi}{\lambda}, d_y = \lambda/2,$$

$\lambda$ is the wavelength of the carrier signal, and $d_y$ is the spacing between the antenna elements in each column.

20. The method of claim 18, further comprising adjusting a phase of the carrier signal to phase lock the output signal from each of the first plurality of beam-formers to the received total antenna array output signal based on a comparison of the phase of the of the beam-former output signal from each of the first plurality of beam-formers to the corresponding combiner of each antenna element and the phase of the received signal outputted by each antenna element.

* * * * *